April 23, 1957   J. E. FINLEY ET AL   2,789,360
METHOD AND MEANS FOR CHECKING AND SETTING GAGES
Filed Nov. 18, 1953   2 Sheets-Sheet 1

INVENTORS
John E. Finley
BY Stanley A. Fuller

Gehr and Leonard
attorneys

2,789,360
Patented Apr. 23, 1957

2,789,360

METHOD AND MEANS FOR CHECKING AND SETTING GAGES

John E. Finley, Mayfield Heights, and Stanley A. Fuller, Lyndhurst, Ohio, assignors to The Pipe Machinery Company, Wickliffe, Ohio, a corporation of Ohio Application November 18, 1953, Serial No. 392,907

4 Claims. (Cl. 33—199)

The invention relates to an improved method and means for checking the accuracy of gages which are used to check male screw threads, the invention being applicable both to gages of the solid type and the adjustable type including adjustable ring gages and snap gages. In the case of solid gages the invention is useful in checking the gage for accuracy within specified tolerance at the time of manufacture and also for checking wear of such gages in the course of their use. The invention is similarly applicable to adjustable gages and in addition is especially useful in initially setting and later resetting such gages following wear in use.

Under prior practice gages for male threads have been checked for size and, in the case of adjustable gages, have been reset following wear by the use of a threaded setting plug formed with a male thread having the same pitch diameter throughout the entire length of the threaded zone, such use involving essentially a "snug" fit on the threaded plug. In such prior practice the pitch diameter of the setting plug could vary from the true normal or basic diameter within a specified tolerance. Because of the snug-fit requirement of the prior practice, any tolerance in the gage itself is eliminated. Also, in the prior practice an important personal factor is involved in making the check, both originally at the time of manufacture and in subsequent check for inspection and, in the case of the adjustable gage, in adjustment for wear in service, because the required "snug" fit between the plug and the thread gage is wholly a matter of feel which will vary from person to person. In the case of adjustable gages the prior practice also consumes an undue amount of time in setting the gage, as well as undesirable wear. Furthermore the permitted variation of the pitch diameter of the setting plug within the specified tolerance may give a plug diameter at the upper limit of the tolerance and this may result in an adjustable gage being set outside of the tolerance limit due to the factor of feel and may result in oversize diameters of the work pieces passed on inspection.

It is an object of the present invention to provide a new and improved method of checking the size and accuracy of thread gages used for the inspection of male threads which is not dependent upon the operator's sense of feel, which can be carried out easily and rapidly, which causes very little wear on the parts involved so that a high degree of accuracy of inspected work is assured and the entire range of a specified tolerance is made available to the producer of male threaded parts, and which detects pitch diameter wear and thread flank wear in the thread gage as well as pitch diameter taper and "bell mouth."

A further object of the invention is to provide a method of both checking and setting adjustable thread gages used for the inspection of male threads which has the advantages specified in the last preceding paragraph.

It is also an object of the present invention to provide improved means for carrying out the methods characterized above.

For the attainment of the above-stated objects, the invention as to the improved methods and means, consists in certain steps and structural means, respectively, hereinafter defined in appended claims.

Inasmuch as the invention in its various applications may be understood from a consideration of its use in the checking and setting of adjustable thread gages the invention and the preferred manner of practicing it will be explained by describing below a particular procedure and structural means suitable for the checking and adjustment of thread gages of the adjustable ring type, the description having reference to the accompanying drawings which show a preferred form of gage setting plug for carrying out the improved method together with an adjustable thread ring gage of conventional construction.

Figure 1:
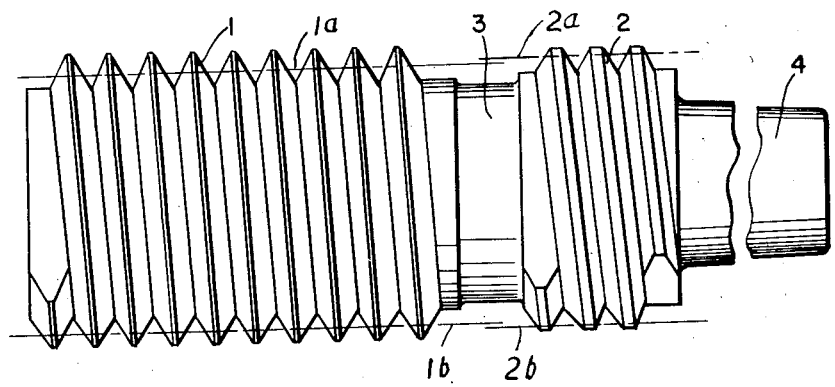
Figure 1 is a side elevation of an improved setting plug suitable for use in carrying out the method of the present invention.

The setting plug, as shown in Fig. 1, is an integral structure having a front zone 1 formed with a full thread, a zone 2 formed with a truncated thread and spaced from the zone 1 by a plain relieved zone 3 which serves to facilitate formation of the threaded zones. To the rear of zone 2 the plug has a tapered handle or support 4.

The threads of zone 1 and zone 2, except for the truncation of the latter are made to the same standard form as the threaded work to be produced and inspected. In zone 1 the dot-and-dash lines 1a and 1b indicate the pitch diameter of the zone 1 thread which is made to the lower limit of the tolerance to be allowed in the pitch diameter of threaded ring gages to be produced or checked. Similarly, in zone 2 the dot-and-dash lines 2a and 2b indicate the pitch diameter of the truncated thread which is made to the upper limit of the tolerance to be allowed in the pitch diameter of the threaded ring gage to be produced or checked. In the drawing the difference in the pitch diameters of the two zones 1 and 2 is greatly exaggerated for clarity. The difference actually may amount to as little as .0001" to .0003", depending on the diameter of the thread and the standard of accuracy required.

Figure 2:
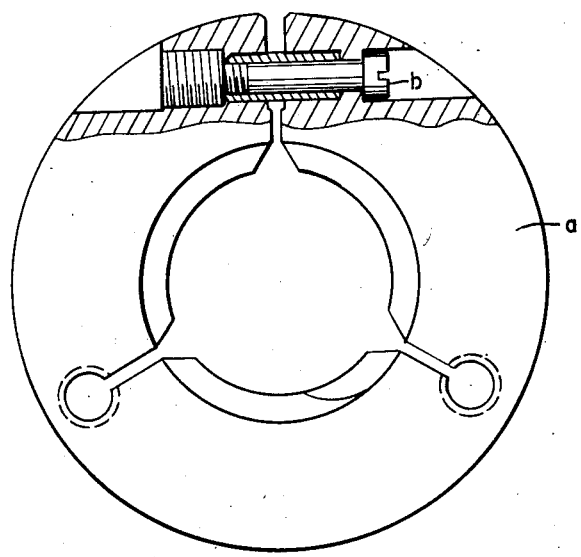
Fig. 2 is a face view of a conventional ring gage with a portion of the gage body in section to show the adjusting means.

The conventional ring gage shown in Fig. 2 has an interrupted ring body $a$ partially severed at two points to form three sectors adjustable in diameter by means of the adjusting screw $b$, the inner sides of the ring being formed with a female thread of desired form to fit the male threaded work to be inspected. The gage being of conventional construction need not be further described except to note that the axial thickness of the gage is substantially greater than the axial width of the relieved zone 3 of the setting plug.

In setting adjustable gages, such for example as that shown in Fig. 2, by the method of the present invention, the operator may proceed by first opening the ring gage to a size somewhat larger than the front or "low" zone of the plug and the gage is threaded on said zone. The gage is then tightened on the low zone until it is a loose fit. Thereupon the gage is turned forward until it contacts the second or "high" zone of the plug which, when the gage is properly adjusted, should not enter the gage. If, on the first adjustment of the gage, the high zone of the plug does enter the gage, the latter is backed off and tightened further on the low zone of the plug and the described procedure repeated until the gage will not go on the high zone, which indicates a proper setting.

Figure 3:
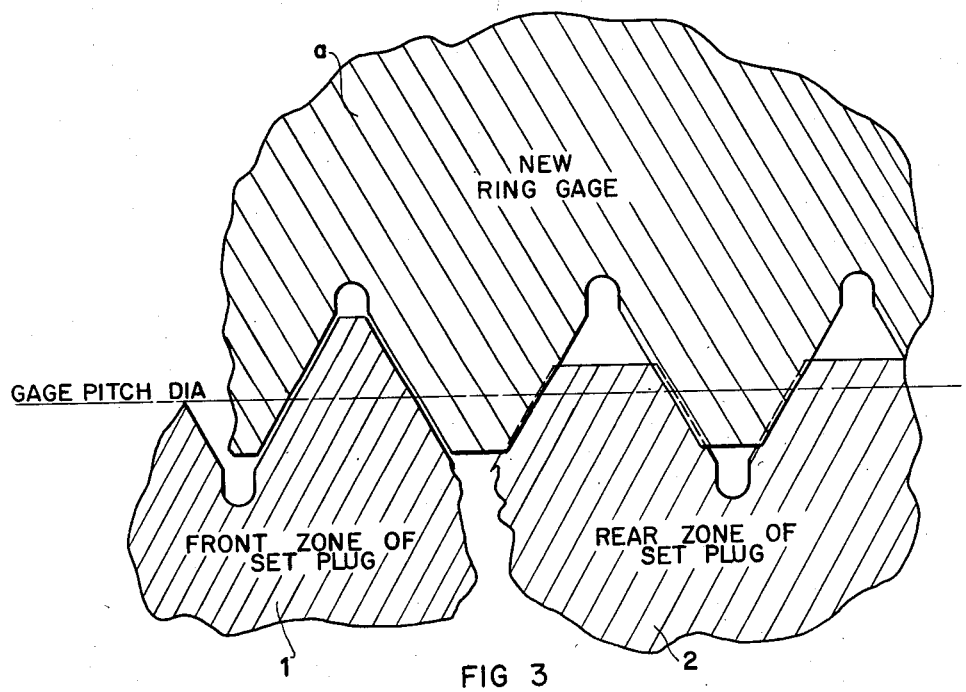
Fig. 3 is a fragmentary enlarged axial section through a new and unworn ring gage body and front and rear zone portions of our improved setting plug.
Figure 4:
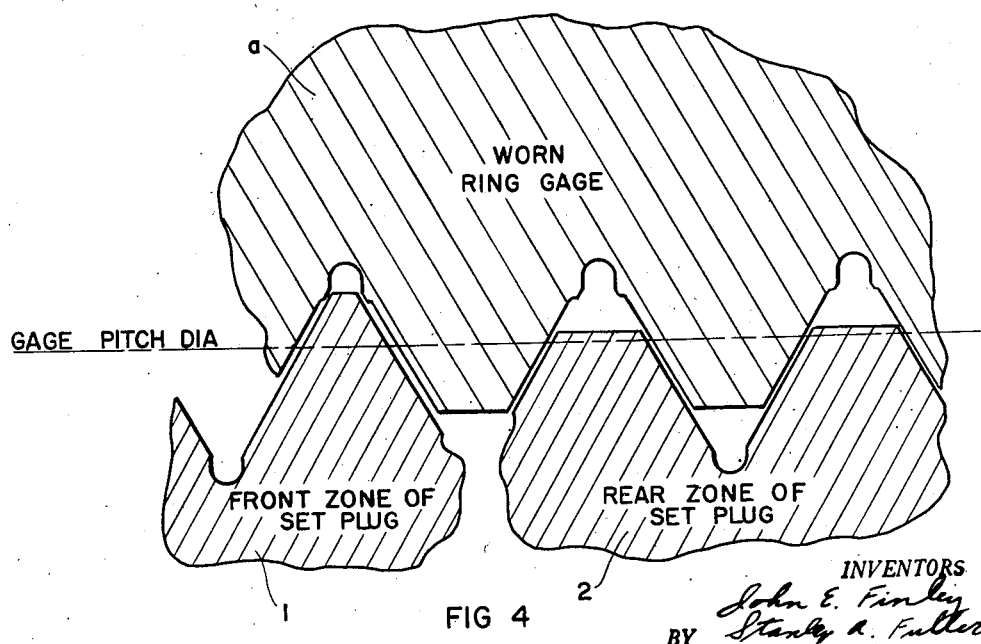
Fig. 4 is a section similar to that of Fig. 3 but with a worn ring gage body shown in place of the unworn gage body shown in Fig. 3.

By way of further explanation of the invention reference is now had to Figs. 3 and 4 of the drawings which are somewhat diagrammatic in character, and, for the sake of clarity, considerably exaggerate clearances and interferences.

In Fig. 3 the body $a$ of a new or unworn adjustable ring gage is shown after setting the gage on our improved setting plug. The clearance shown between the female thread of the gage and the male thread of the front zone 1$a$ of the plug indicates (with exaggeration) the loose fit between these parts that exists when the gage is suitably set. Similarly the interference shown (with exaggeration) between the gage thread and the truncated thread of the rear zone of the plug indicates that, for the same setting of the gage the rear zone of the plug will not enter the gage.

The section shown in Fig. 4 is generally similar to that shown in Fig. 3 but represents the ring gage body $a$ fitted to the front or low zone of our setting plug after typical wear of the ring gage thread form caused by gaging male threaded product, the major diameter of which varies (within permitted tolerance) causing a step to wear in the flank of the gage thread. As indicated in Fig. 4, while the flanks of the gage thread near the root thereof fit the plug thread of the front zone 1 near the crest thereof, yet because of the stepped wear of the gage thread the latter does not interfere with the truncated thread of the rear zone 2 of the plug although the pitch diameter of the latter zone is larger than that of the front zone. Thus it is clear that the improved setting plug can be used to detect excessive stepped wear of gages.

It should be noted that in the manufacture of our improved setting plug the major or outside diameter of the rear or high zone is made smaller than the minimum major diameter of the male threaded product. This is necessary to clear any step that may be worn into the thread flanks of the ring gage. This result is secured, as shown in the drawing, without carrying the truncation of the thread of the rear zone of the plug to a point that would render the rear zone ineffective to represent the angle of the thread.

It is also noted that the thread form of the improved setting plug is generated continuously throughout its entire threaded length, the threads of the front and rear zones being in phase and their leads and angles being the same, so that there is secured by the present invention a result that cannot in practice be secured by the use of two separate plugs formed with zones 1 and 2, respectively.

The above-described procedure in checking gages on the improved setting plug is followed in setting worn as well as unworn gages, but it should be observed that, in the setting of worn gages, if the gage passes over the rear or high zone of the plug, despite proper setting on the front or low zone of the plug, excessive stepped wear of the gage thread, such as is illustrated in Fig. 4, is indicated and the gage should be removed from service; for, since the front and rear zones of the setting plug have the same lead and angles, the lack of interference of the rear or high zone with the thread of the ring gage can be caused only by excessive pitch diameter wear in the gage thread.

In the use of the improved setting plug, if after proper setting of the gage on the front zone of the plug, the rear zone of the plug partially enters into the ring gage before stopping and does not pass entirely through the gage, a tapered pitch diameter or "bell mouth" condition in the gage thread is shown to exist; and, as is apparent, such a condition is readily detected by the use of the improved setting plug.

It will be seen that the described method of setting adjustable gages insures a setting above the low limit of the prescribed tolerance and below its upper limit, thus making possible greater accuracy in male threads inspected with the gages set with the plug. Furthermore, it is evident that the setting operation can be carried out easily and rapidly by the operator, that uncertainty due to the "snug" fit requirement in prior practice is eliminated and that wear of both setting plug and gage is minimized and the life of these parts correspondingly increased.

It will be apparent to those familiar with the manufacture and use of gages for male threads that the advantage, in the use of our improved setting plug, of avoiding the personal factor incident to "snug" fit can be realized also in the use of the plug in the checking of male thread gages of the solid or unadjustable type both in the course of their manufacture and later in the checking of such gages for wear incident to use. Thus, in the course of grinding or lapping a solid ring gage to desired dimensions the improved setting plug can be used from time to time to check the gage; and as soon as the forming operation reaches the point where the front or low zone of the plug will enter the gage but the rear or high zone will not enter, it is certain that the gage is within the predetermined tolerance of the plug. It will also be apparent that gage wear of the kinds already referred to in connection with the adjustable ring gage will be detected by our improved setting plug in the case of solid ring gages.

While various fabricating techniques can be employed in the production of the improved setting plugs according to the size and character of the male threads to be checked, a general procedure which is suitable includes:

(1) Grinding a continuous thread to over-size dimensions from the front end of the low zone to the rear end of the high zone of the plug;

(2) Grinding the relief between the two zones;

(3) Grinding the truncation of the high zone threads;

(4) Lapping the threads of the low and high zones to their respective low and high pitch diameter sizes corresponding to the tolerance specified for the threaded product to be checked.

It is to be understood that by explaining the invention with reference to a particular ring type of gage it is not intended to correspondingly limit the scope of the invention except as expressly indicated by the appended claims.

What is claimed is,

1. A method of checking the dimensions of a gage for male screw threads within a specified pitch diameter tolerance, the said method including the steps of providing a gage plug comprising a front zone with a fully formed screw thread having a pitch diameter equal to the low limit of the specified tolerance and a second zone to the rear of the front zone formed with a screw thread having the same lead and angle as the front zone thread and in phase with the latter and having a pitch diameter equal to the high limit of the specified tolerance, the rear zone thread being truncated to a diameter substantially smaller than the minimum outside diameter of the male screw thread to be gaged but large enough to preserve the flank angle of the thread; checking entry into the gage first of the front zone of the setting plug; and thereafter while the said front zone is engaged with the gage thread, checking entry into the gage of the rear zone of the plug.

2. A method of setting an adjustable gage for male screw threads within a specified pitch diameter tolerance, the said method including the steps of providing a gage plug comprising a front zone with a fully formed screw thread having a pitch diameter equal to the low limit of the specified tolerance and a second zone to the rear of the front zone formed with a screw thread having the same lead and angle as the front zone thread and in phase with the latter and having a pitch diameter equal to the high limit of the specified tolerance, the rear zone thread being truncated to a diameter substantially smaller than the minimum outside diameter of the male screw threads to be gaged but large enough to preserve the flank angle of the thread; and adjusting the gage by trial on the plug to a size that will permit entry into it of the front zone of the plug and prevent entry into it of the rear zone of the plug.

3. A plug for checking and setting gages for male threads, the plug comprising a front zone with a fully formed male screw thread having a pitch diameter equal to the lower limit of a specified tolerance and comprising a second zone to the rear of the front zone with a male screw thread having the same lead and angle as the front zone thread and in phase with the latter and a pitch diameter equal to the high limit of the said specified tolerance, the rear zone thread being truncated to an outside diameter substantially smaller than the outside diameter of the fully formed thread of the front zone and large enough to check the angle of the gage thread.

4. A method of setting an adjustable gage for male screw threads within a specified pitch diameter tolerance, the said method including the steps of providing a gage plug comprising a front zone with a fully formed screw thread having a pitch diameter equal to the low limit of the specified tolerance and a second zone to the rear of the front zone formed with a screw thread having the same lead and angle as the front zone thread and in phase with the latter and having a pitch diameter equal to the high limit of the specified tolerance, the rear zone thread being truncated to a diameter substantially smaller than the minimum outside diameter of the male screw threads to be gaged but large enough to preserve the flank angle of the thread; adjusting the gage by trial on the plug to a size that will permit entry into it of the front zone of the plug and prevent passage entirely through it of the rear zone of the plug; then, as a check on "bell mouth" of the gage, checking the extent, if any, to which the rear zone of the plug enters the gage.

References Cited in the file of this patent

UNITED STATES PATENTS

| | | |
|---|---|---|
| 1,130,866 | Wells et al. | Mar. 9, 1915 |
| 1,588,363 | Hanson | June 8, 1926 |
| 2,597,644 | P. Johnson | May 20, 1952 |
| 2,609,614 | S. Johnson | Sept. 9, 1952 |

FOREIGN PATENTS

| | | |
|---|---|---|
| 369,516 | Great Britain | Mar. 24, 1932 |